United States Patent [19]

Kremer et al.

[11] Patent Number: 4,585,629

[45] Date of Patent: Apr. 29, 1986

[54] TREATMENT OF WATER USED IN PREPARING PHOSPHATE MATRIX SLURRIES

[75] Inventors: Ross A. Kremer, Ringoes; Stephen W. Saunders, Plainsboro, both of N.J.

[73] Assignee: Mobil Oil Corporation, New York, N.Y.

[21] Appl. No.: 649,235

[22] Filed: Sep. 10, 1984

Related U.S. Application Data

[63] Continuation-in-part of Ser. No. 545,553, Oct. 26, 1983.

[51] Int. Cl.[4] .............. C01F 11/00

[52] U.S. Cl. .............. 423/167

[58] Field of Search .............. 423/167

[56] References Cited

U.S. PATENT DOCUMENTS

| | | | |
|---|---|---|---|
| 3,008,575 | 11/1961 | Clawson et al. | 209/12 |
| 3,035,867 | 5/1962 | Corbett | 302/14 |
| 3,314,537 | 4/1967 | Greene et al. | 209/5 |
| 3,359,037 | 12/1967 | Every et al. | 299/4 |
| 4,042,666 | 8/1977 | Rice et al. | 423/167 |
| 4,177,243 | 12/1979 | Schwartz et al. | 423/167 |
| 4,194,969 | 3/1980 | Chung et al. | 209/5 |
| 4,220,630 | 9/1980 | Oré | 423/167 |
| 4,374,817 | 2/1983 | Lehman et al. | 423/319 |
| 4,402,923 | 9/1983 | Lang | 423/319 |
| 4,514,288 | 4/1985 | Kremer et al. | 209/5 |

*Primary Examiner*—John Doll
*Assistant Examiner*—Wayne A. Langel
*Attorney, Agent, or Firm*—Alexander J. McKillop; Michael G. Gilman; Stanislaus Aksman

[57] ABSTRACT

There are disclosed method and compositions for reducing the viscosity of phosphate matrix slurries and improving consolidation characteristics of slimes resulting from the beneficiation of the slurries. An unexpectedly greater degree of viscosity reduction and clay consolidation characteristics improvement is obtained by adding the compositions to the water utilized to slurry the phosphate matrix prior to the information of the slurries. The compositions include water-soluble compounds, such as organic acids, mineral acids, monovalent inorganic salts and polyvalent inorganic salts.

19 Claims, 16 Drawing Figures

TREATMENT OF WATER USED IN PREPARING PHOSPHATE MATRIX SLURRIES

CROSS-REFERENCE TO RELATED APPLICATIONS

This application is a continuation-in-part of a copending application, Ser. No. 545,553, filed on Oct. 26, 1983, the entire contents of which are incorporated herein by reference.

BACKGROUND OF THE INVENTION

1. Field of the Invention

The present invention relates to an improved method of processing of phosphate matrix slurries. More particularly, the present invention relates to a method of reducing the viscosity of phosphate matrix slurries, and improving the consolidation characteristics of phosphatic clays remaining in the water suspension after the phosphate ore beneficiation process is completed, by dissolving an additive in the water utilized to form the matrix slurries.

2. Discussion of the Prior Art

The problems associated with handling of phosphate-containing ores in phosphoric acid manufacturing processes are well recognized. One of the principal problems associated with handling of phosphate matrix (low grade, poor quality clay-bearing phosphate rock) is the viscosity of phosphate matrix slurries. The phosphate matrix is normally slurried with water in order to facilitate transport of the phosphate-containing ore from a mining site through a pipeline or conduit to a beneficiation facility. In order to promote the efficiency of this transport process, it is highly desirable to maintain as high a slurry concentration as possible without causing extraordinarily high viscosities or excessive pump wear. Accordingly, it is highly desirable to reduce the viscosity of the phosphate matrix slurries so that the energy requirements of the pumping process can be reduced and the productivity of the process can be increased.

Various methods and additives for reducing the viscosity of phosphate matrix slurries have been proposed in the prior art. For example, U.S. Pat. No. 3,035,867 to Corbett teaches the use of additives selected from the group consisting of free coal acids, alkali metal and ammonium salts of free coal acids, and mixtures of these compounds in order to reduce the viscosity of slurries containing phosphate rock. U.S. Pat. No. 4,042,666 to Rice et al teaches the addition of an additive selected from the group consisting of aliphatic hydroxy acids containing 2–6 carbon atoms, water-soluble inorganic salts of the aliphatic hydroxy acids, and blends of the aliphatic hydroxy acids or the aliphatic hydroxy acid salts with a strong base in a process for treating clay-containing phosphate rock slurries in order to reduce the viscosity of these slurries. Additional examples of prior art additives and processes for reducing the viscosity of phosphate matrix slurries are seen in U.S. Pat. No. 4,177,243 to Schwartz et al; U.S. Pat. No. 4,220,630 to Oré; U.S. Pat. No. 4,374,817 to Lehman et al; and U.S. Pat. No. 4,402,923 to Lang.

The above-cited prior art references generally teach that viscosity reducing agents may be added at various points during processing of the phosphate matrix. For example, U.S. Pat. No. 4,177,243 to Schwartz et al teaches that the viscosity reducing agents described therein may be added during grinding of the phosphate matrix, or may be added to a slurry of the ground phosphate matrix. U.S. Pat. No. 3,035,867 to Corbett teaches the addition of the viscosity reducing agent by means of either dry mixing with the phosphate matrix or the addition thereof to a slurry containing the ground phosphate matrix. U.S. Pat. No. 4,374,817 to Lehman et al teaches that the viscosity reducing agents described therein can be added at any stage during the preparation of the phosphate matrix slurries, but are preferably added during wet grinding of the phosphate matrix. U.S. Pat. No. 4,042,666 to Rice et al teaches that a chemical treatment to prevent swelling of residual clays and thereby reduce the viscosity of phosphate matrix slurries may be employed at any stage during processing of the phosphate matrix.

The above-cited references are similar insofar that they do not teach that a greater reduction in the viscosity of the phosphate matrix slurries may be obtained by dissolving a viscosity reducing additive in the water utilized to form the slurries.

Another important problem associated with the recovery of phosphate values from the phosphate matrix is the recovery of water used in slurrying the matrix. The matrix, usually mined by surface mining methods, is usually comprised of clay, silica sand and phosphate. Majority of the clay particles are in the size range of less than one micron ($\mu$). After the matrix is mined, it is conventionally combined with water to form a slurry, which is subjected to washing, screening, agglomeration and classification before it is transported to the phosphate beneficiation operation, e.g., agglomeration flotation or froth flotation. During the washing operations, extremely finely divided material, originally in the matrix, remains in the aqueous suspension. This aqueous suspension is commonly called "slime" or "phosphatic slime", and it is produced in large quantities during the phosphate ore beneficiation process. The slimes usually amount to about 20–40% of the phosphate ore mined. When it is considered that the slimes are formed as aqueous suspensions containing 1–5% solids, it becomes apparent that enormous quantities of water are used in the phosphate matrix processing.

The disposal of vast amounts of the generated slimes and secondarily the recovery of residual phosphate values from slimes presents pressing problems for the phosphate industry.

Slimes present a problem because they retain substantial amounts of their original water, even after years of settling. Not only does this result in an area having no bearing strength, but it also results in the waste of increasingly rare natural resources, water and land. Even after settling for many years, the slimes settle to only about 20–25% by weight of solids and still are jelly-like in consistency. As a result, there are large areas near the phosphate producing areas of Florida that are virtually useless for any purpose.

The slimes are retained in dammed ponds which must be continuously inspected and repaired. Such dams may fail, thereby polluting the land, rivers and lakes. The pollution damage may be especially severe in the case of polluted waters because of the potentially lethal effects on fish and other life.

The industry has attempted over the years to eliminate the wasteful loss of phosphate values, water and land. For example, U.S. Pat. No. 4,194,969, discloses that the treatment of a phosphate ore matrix with an electrolyte solution containing metal ions e.g., aluminum, calcium, iron and zinc, and anions, e.g., nitrate, chloride, sulfate and acetate hydroxide, facilitates more rapid slimes sedimentation. Other slimes formation modifying techniques are disclosed in U.S. Pat. No. 3,008,575 of Clawson et al, and No. 3,314,537 of Greene.

Every et al, U.S. Pat. No. 3,359,037 disclose a method of mining of phosphate matrix comprising contacting the matrix deposit with a mineral acid, e.g., sulfuric, phosphoric or nitric acids, to chemically attack the nonphosphatic material cementing the phosphatic particles.

However, none of the previous methods met with the success required in commercial operations.

Therefore, a principal object of the present invention is the provision of an improved method of processing phosphate matrix slurries.

An additional object of the present invention is the provision of novel matrix slurries- and slime-modifying compositions which are added to the water utilized to form phosphate matrix slurries.

SUMMARY OF THE INVENTION

There is provided a method of producing water-based phosphate matrix slurries comprising treating the water, prior to the formation of the slurries, with a water-soluble additive selected from the group consisting of organic acids, mineral acids, polyvalent inorganic salts, monovalent inorganic salts and mixtures thereof. Subsequently, the phosphate matrix is contacted with the additive-containing water to obtain a slurry of the phosphate matrix in the additive-containing water.

The thus-formed additive-containing slurry has a reduced viscosity, which facilitates the slurry-transfer operations. The additive-containing slurry, as most of the phosphate ore is removed therefrom, is subjected to conventional beneficiation operations which produce slimes as a by-product of the beneficiation procedures. The slimes have improved consolidation characteristics, i.e., the solid particles in the slimes settle more rapidly to the bottom of the retaining vessel or pond, and to a higher final consolidation density, than the slimes obtained from a matrix slurry which has the same additives added thereto after the aqueous slurry is formed.

BRIEF DESCRIPTION OF THE DRAWINGS

The present invention will now be described in greater detail, with reference being made to the accompanying drawings, in which.

DETAILED DESCRIPTION OF THE INVENTION

Figure 1:
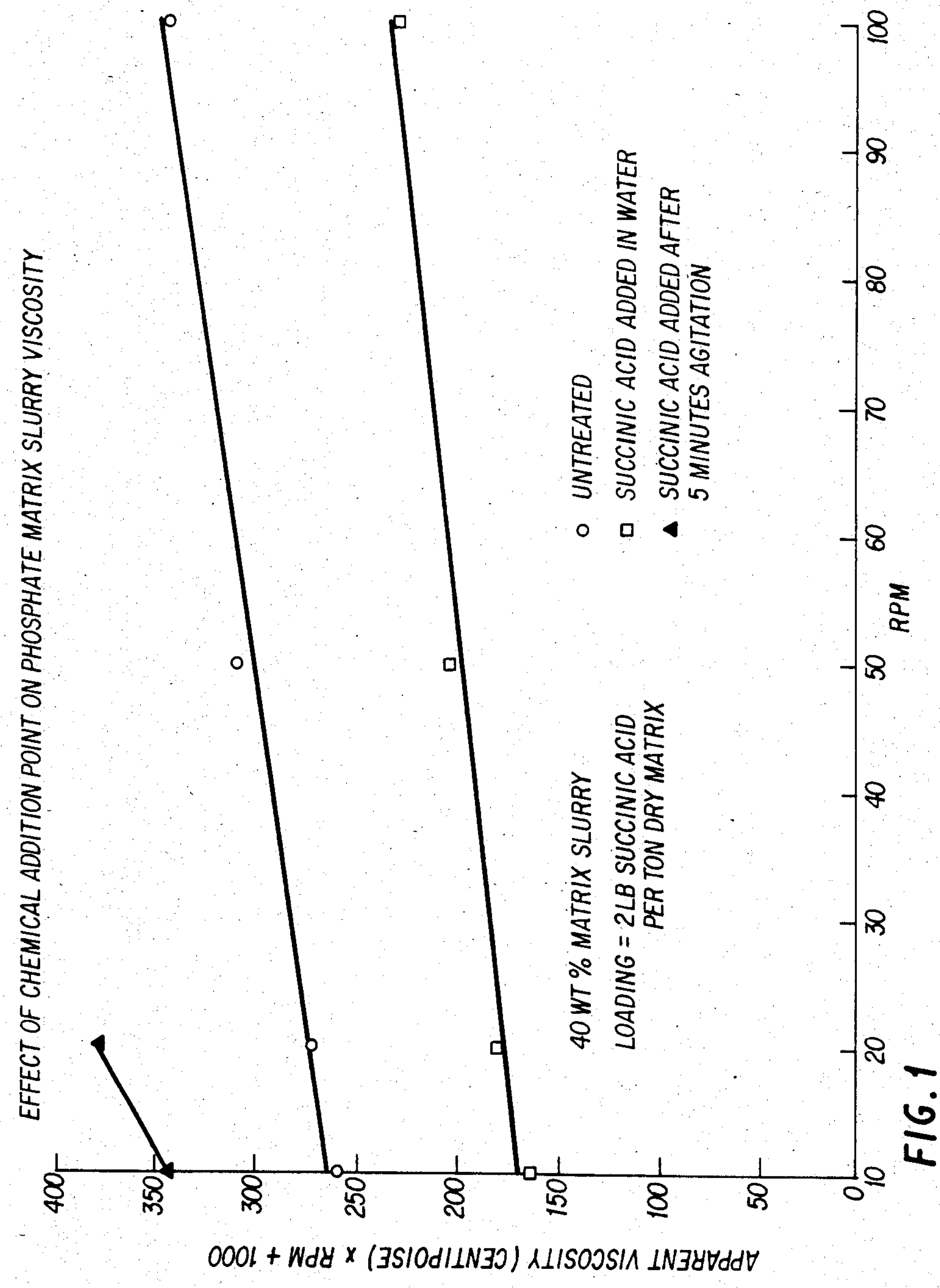
FIGS. 1–16 are graphs illustrating the effect of the additive addition point on phosphate matrix slurry viscosity and phosphatic clay consolidation properties.

We discovered that the addition of one or more of the above-identified additives to the water utilized to slurry the phosphate matrix prior to the formation of the slurry results in an unexpectedly greater reduction in the viscosity of phosphate matrix slurry than the addition of the same additives to a previously-prepared slurry.

The addition of the additive to the water prior to the formation of the slurry also results in a greater improvement in the consolidation characteristics of the slimes than the addition of the same additive to a previously-prepared slurry.

The amount of the additive required to treat the water utilized to slurry the phosphate matrix varies depending on several factors, such as the purity of the phosphate matrix and the desired solids content of the slurries. In general, it has been found that approximately $\frac{1}{2}$ to 10 pounds of the additive added to the water per ton of dry phosphate matrix is required to obtain a slurry containing about 2 to about 30,000 ppm by weight (ppmw), preferably about 20 to about 5000 ppmw, of the additive in a slurry having the solids content of about 1 to about 50% by weight. Such level of the additive in the slurry is sufficient to achieve the desired degree of viscosity reduction and clay consolidation characteristics improvement in slurries having a solids content of 1 to 50% by weight.

The invention is especially applicable to the processing of the phosphate matrix (ore) which normally comprises physical mixtures of discrete particles of phosphate minerals, silica sand, clay minerals, and minor amounts of various other minerals, such as dolomite, calcium carbonate and heavy minerals. These minerals occur in varying ratios and are not usually agglomerated or strongly cemented in unconsolidated sedimentary deposits, except in cases where clay is absent and an environment existed for secondary precipitation of agglomerating compounds. In conventional phosphate matrix mining operations, which recover such phosphate matrix, overburden is initially removed by mechanical means, e.g., by a drag line. The ore matrix is then slurried with water, usually introduced by a high-speed jet. The matrix slurry is moved to the beneficiation plant by a pipeline. In the plant, the slurry is conducted through the screening, washing, sizing and classification steps. Additional amounts of water are used in all four of these steps.

It is imperative for the purposes of this invention to introduce the additive into the water prior to the contact thereof with the matrix, so that the water in the high-speed jet contains the aforementioned amounts of the additive when it contacts the matrix. Generally, it is sufficient to add the additive to the water only once, before the water comes into contact with the slurry, to maintain the required, aforementioned amounts of the additive in the water. However, it will be apparent to those skilled in the art that the additive may also be added to the water at any one of the downstream stages of the phosphate ore processing operation so long as it is added to the water, in the requisite quantities, before the water first comes into contact with the matrix.

Although it is normally desirable to maintain the solids content of the slurries as high as possible, a solids content of less than 40% by weight is preferred, since slurries having a solids content of greater than 40% by weight are relatively more viscous and, as a result, are more difficult to pump through a pipeline or conduit. It will be apparent to those skilled in the art that only such an amount of the additive is used as is necessary to obtain a slurry having the aforementioned concentration of the additive therein. Thus, if water used to prepare the slurry, or the water used in the beneficiation plant, already contains some of the particular additive, the amount of the additive added thereto will be adjusted to obtain a slurry containing the above-specified concentration of the additive.

The additive may be dissolved in the water utilized to slurry the phosphate matrix in any suitable manner. After dissolving the additive in the water, the additive-containing water is combined with the strip-mined phosphate matrix to form a phosphate matrix slurry. Various methods of combining the water and the phosphate matrix in order to form the slurry may be utilized. The phosphate matrix-containing slurry is then transferred by any suitable means, e.g., by hydraulic means, to the conventional downstream phosphate ore beneficiation process steps, such as washing, screening and classification.

The additives of the present invention are water-soluble compounds selected from the group consisting of organic acids, mineral acids, monovalent metallic or non-metallic inorganic salts, polyvalent metallic or non-metallic inorganic salts, and mixtures thereof. The additives are required to have a water solubility of at least 200 parts per million or 0.02 weight %.

Suitable organic acids used in the process are carboxylic, dicarboxylic and hydroxy acids containing from 1 to 5 and preferably from 1 to 4 carbon atoms. Examples of carboxylic acids which may be utilized in the method of the present invention are formic, acetic, propionic, butyric and valeric acids, preferably formic, acetic and propionic, and most preferably formic and acetic acids.

Examples of dicarboxylic acids which can be utilized in the process of the present invention are oxalic, malonic, succinic, glutaric, maleic and fumaric acids, preferably oxalic, malonic, succinic, maleic and fumaric acids, and most preferably succinic and maleic acids.

Examples of hydroxy acids which can be utilized in the process of the present invention are glycolic, (+)- and (±)-lactic, (±)α-hydroxybutyric, (±)-mandelic, (−)-glyceric, (−)- and (±)-malic acids, preferably (−)-glyceric, (−)- and (±)-malic acids, and most preferably (−)- and (±)-malic acids.

Examples of the mineral acids which can be utilized in the process of the present invention are hydrochloric, phosphoric, hydrobromic, hydrofluoric, nitric, sulfuric and perchloric acids, preferably hydrochloric, hydrobromic, nitric and sulfuric acids, and most preferably hydrochloric and nitric acids.

Examples of monovalent non-metallic salts which can be utilized are salts of ammonium, e.g., ammonium nitrate, ammonium chloride, ammonium carbonate and ammonium sulfate, preferably ammonium nitrate and ammonium chloride.

Examples of monovalent metallic salts which can be utilized are sodium chloride and potassium chloride. Such monovalent metallic salts are preferably used to reduce viscosity of the slurries.

Examples of the polyvalent inorganic salts which can be utilized are stannic chloride, aluminum sulfate, magnesium nitrate, calcium sulfate, calcium nitrate, aluminum nitrate and ferric chloride.

Ammonium nitrate is the most preferred additive, of all of the additives set forth above, because of its effectiveness in reducing the viscosity of the slurry, in improving consolidation characteristics of the processed slurry and because of its relatively low cost.

In order to more fully illustrate the nature of the invention and the manner of practicing same, the following examples are presented.

The viscosity reducing and clay consolidation-promoting effects of representative compounds of the above-listed additives is demonstrated by the data of the following examples.

EXAMPLE 1

(Viscosity Reduction With Calcium Nitrate)

The viscosity reducing effect of calcium nitrate was tested by treating a typical phosphate matrix sample obtained from a mining site in the Fort Meade, Fla. area. The sample contained 84.3% by weight solids. The matrix was slurried at 40% by weight solids with water which had been previously treated with 1 pound of calcium nitrate, $Ca(NO_3)_2.4H_2O$, per ton of dry matrix. The resulting slurry was subjected to high shear conditions (20 minutes agitation with a twin-blade mixer) to simulate field operation. The rheology of a portion of this slurry was then studied and compared to that of a slurry which was formed by using untreated water. Viscosity measurements were taken using a Model RV Brookfield Viscometer (manufactured by Brookfield Engineering Laboratories, Inc., Stoughton, Mass.), No. 2 spindle. The apparent viscosity was observed at three different revolutions per minute, RPM's, 1, 10 and 100, thereby allowing the calculation of the Bingham yield point and the plastic viscosity. As is known to those skilled in the art, Bingham yield point is the y-intercept of the line fitting the data in a shear-shearing stress diagram. As is also known to those skilled in the art, plastic viscosity is the slope of this line. These parameters define the rheology of a non-Newtonian fluid, such as phosphatic clay slurries. The measurement and significance of these parameters is discussed in greater detail in a thesis of Rajen Chanchani, entitled "THE EFFECT OF DEFLOCCULANTS ON THE RHEOLOGICAL BEHAVIOR OF CONCENTRATED PHOSPHATE SLIME", published at the University of Florida, Gainesville, Fla., 1976, the entire contents of which are incorporated herein by reference. Each slurry was then diluted to 30% by weight solids with untreated water and the viscosity measurements described above were repeated. The results presented in Table 1 below indicate that the addition of calcium nitrate reduced the Bingham yield point by 30% in the phosphate matrix slurry containing 40% by weight solids, and by 40% in the slurry containing 30% by weight solids.

TABLE 1

The Effect of Adding 1.0 lb $Ca(NO_3)_2.4H_2O$ per Ton of Dry Matrix to the Water Used to Slurry the Matrix on the Matrix Slurry Rheology

| | Untreated Slurry | | Treated Slurry | |
|---|---|---|---|---|
| Wt % Solids in the Matrix Slurry | Bingham Yield Point-dynes/cm$^2$ | Plastic Viscosity-cp | Bingham Yield Point-dynes/cm$^2$ | Plastic Viscosity-cp |
| 40 | 2.04 | 49.3 | 1.43 | 18.6 |
| 30 | 0.89 | 52.9 | 0.54 | 36.0 |

EXAMPLE 2

(Viscosity Reduction With Acetic Acid)

The procedure of Example 1 was repeated, except that 1 pound of acetic acid per ton of dry matrix was used as the viscosity reducing additive instead of calcium nitrate. The results presented in Table 2, below, indicate that the addition of acetic acid reduced the Bingham yield point by 35% in the phosphate matrix slurry containing 40% by weight solids, and by in the slurry containing 30% by weight solids.

TABLE 2

| The Effect of Adding 1.0 lb Acetic Acid per Ton of Dry Matrix to the Water Used to Slurry the Matrix on the Matrix Slurry Rheology | | | | |
|---|---|---|---|---|
| | Untreated Slurry | | Treated Slurry | |
| Wt % Solids in the Matrix Slurry | Bingham Yield Point-dynes/cm$^2$ | Plastic Viscosity-cp | Bingham Yield Point-dynes/cm$^2$ | Plastic Viscosity-cp |
| 40 | 2.04 | 49.3 | 1.32 | 22.8 |
| 30 | 0.89 | 52.9 | 0.36 | 15.0 |

EXAMPLE 3

(Viscosity Reduction With Ammonium Nitrate)

The procedure of Example 1 was repeated, except that ammonium nitrate was used as the additive instead of calcium nitrate. The results presented in Table 3 below illustrate that the addition of ammonium-nitrate reduced the Bingham yield point by 38% in the phosphate matrix slurry containing 40% by weight solids, and by 66% in the slurry containing 30% by weight solids.

TABLE 3

| The Effect of Adding 1.0 lb $NH_4NO_3$ per Ton of Dry Matrix to the Water Used To Slurry the Matrix on the Matrix Slurry Rheology | | | | |
|---|---|---|---|---|
| | Untreated Slurry | | Treated Slurry | |
| Wt % Solids in the Matrix Slurry | Bingham Yield Point-dynes/cm$^2$ | Plastic Viscosity-cp | Bingham Yield Point-dynes/cm$^2$ | Plastic Viscosity-cp |
| 40 | 2.04 | 49.3 | 1.27 | 49.3 |
| 30 | 0.89 | 52.9 | 0.30 | 7.8 |

The foregoing examples clearly establish the effectiveness of representative additives in reducing the viscosity of phosphate matrix slurries. The experimental results presented below further illustrate the effectiveness of the additives in reducing viscosity of the slurry, and also demonstrate the greater viscosity reducing effect obtained by dissolving the additives in the water utilized to slurry the phosphate matrix prior to the formation of the slurry.

EXAMPLE 4

(Viscosity Reduction With Succinic Acid)

The viscosities of slurries of chemically treated and untreated phosphate matrices in water were measured according to the following procedures:

Sample 1—untreated water was added to a phosphate matrix sample obtained from a Florida source to reduce the solids content to 40% by weight. The resulting slurry was agitated for 20 minutes in a twin-blade mixer to disperse the solids and simulate pumping of the matrix slurry from a mine to a beneficiation plant. The viscosity of the slurry was then determined using a Brookfield Viscometer at five different shear rates (5, 10, 20, 50 and 100 RPM spindle speeds), and a graph of viscosity×RPM÷1,000 vs. RPM was made. This graph is shown in FIG. 1.

Sample 2—the same procedure was repeated as described above for Sample 1, except that 2 pounds of succinic acid per ton of dry matrix was dissolved in the water, utilized to form the phosphate matrix slurry, prior to the contact of the water with the matrix.

Sample 3—the same procedure was followed as in sample 1, except that 2 pounds of succinic acid per ton of dry phosphate matrix was added to the slurry after 5 minutes of agitation with the twin-blade mixer.

The viscosity values presented in Table 4 below and the graph of FIG. 1 demonstrate that a significant degree of viscosity reduction is obtained by dissolving the additives in the water utilized to form the phosphate matrix slurry before the water is brought into contact with the matrix. The data of FIG. 1 also demonstrates that the addition of the same additive to the previously-prepared slurry of the matrix results in a slurry having higher apparent viscosity than the slurry prepared with untreated water.

TABLE 4

| | Viscosity (Centipoise) at Indicated RPM | | | | |
|---|---|---|---|---|---|
| | 5 | 10 | 20 | 50 | 100 |
| Sample 1 | 30,400 | 26,000 | 13,600 | 6,160 | 3,400 |
| Sample 2 | 19,200 | 16,400 | 9,000 | 4,080 | 2,280 |
| Sample 3 | 44,800 | 34,400 | 19,000 | Off Scale | Off Scale |

EXAMPLE 5

(Viscosity Reduction With Acetic Acid)

Figure 2:
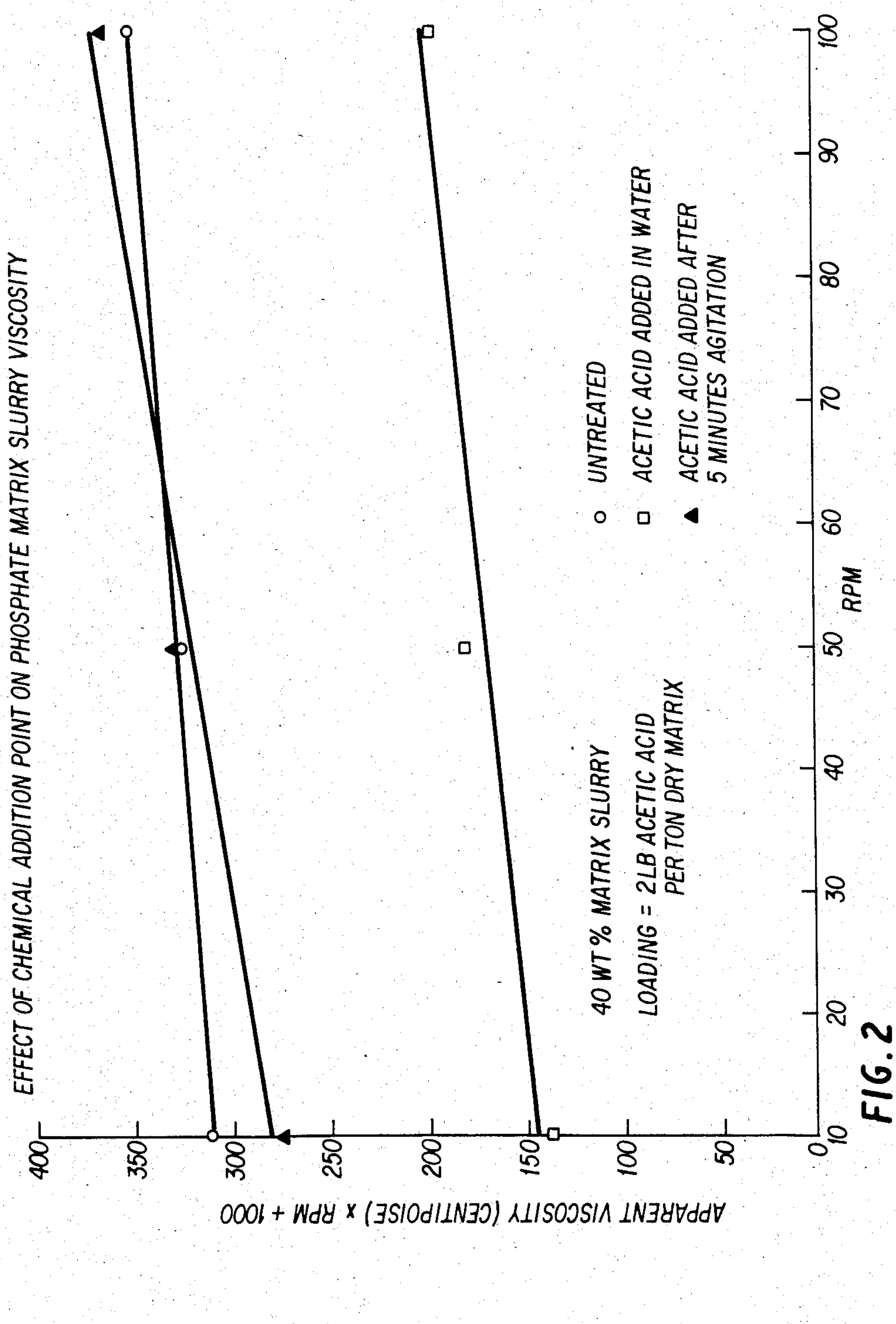

The procedures of Example 4 were followed, except that 2 pounds of acetic acid per ton of dry matrix was utilized instead of succinic acid for Samples 2 and 3, and a different section of matrix was used. The viscosity values of each of the samples are presented in Table 5 below and are illustrated by the graph of FIG. 2.

TABLE 5

| | Viscosity (Centipoise) at Indicated RPM | | | | |
|---|---|---|---|---|---|
| | 5 | 10 | 20 | 50 | 100 |
| Sample 1 | 29,600 | 31,200 | — | 6,480 | 3,480 |
| Sample 2 | 8,000 | 13,800 | — | 3,600 | 1,940 |
| Sample 3 | 47,200 | 27,600 | — | 6,560 | 3,620 |

EXAMPLE 6

(Viscosity Reduction With Formic Acid)

Figure 3:
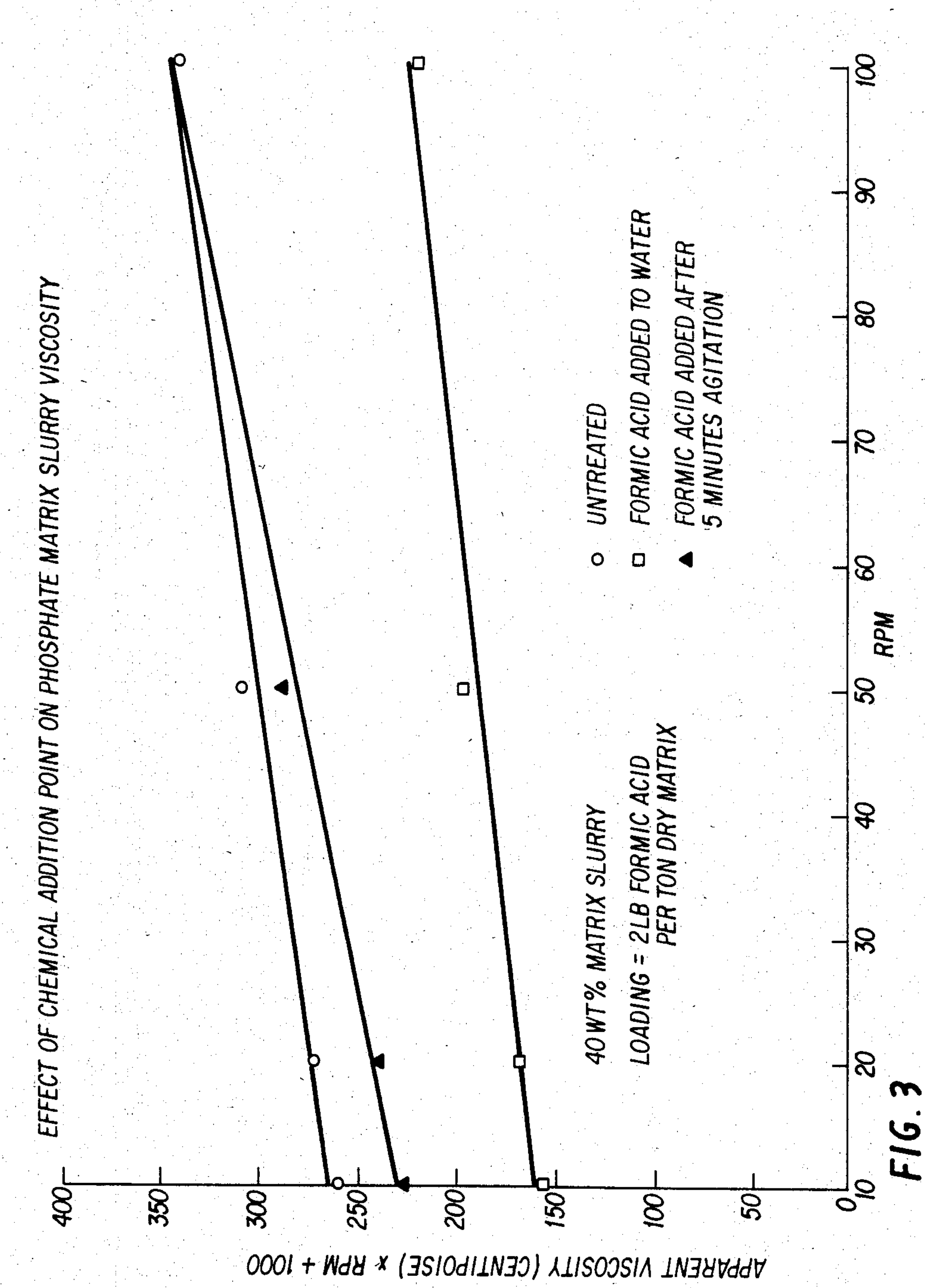

The procedures of Example 4 were used, except that 2 pounds of formic acid per ton of dry matrix was used in place of succinic acid for Samples 2 and 3. The viscosity values of each of the samples are presented in Table 6 below and are illustrated by the graph of FIG. 3.

TABLE 6

| | Viscosity (Centipoise) at Indicated RPM | | | | |
|---|---|---|---|---|---|
| | 5 | 10 | 20 | 50 | 100 |
| Sample 1 | 30,400 | 26,000 | 13,600 | 6,160 | 3,400 |
| Sample 2 | 14,800 | 15,600 | 8,400 | 3,920 | 2,200 |
| Sample 3 | 28,000 | 22,800 | 12,000 | 5,760 | 3,400 |

EXAMPLE 7

(Viscosity Reduction With Malic Acid)

Figure 4:
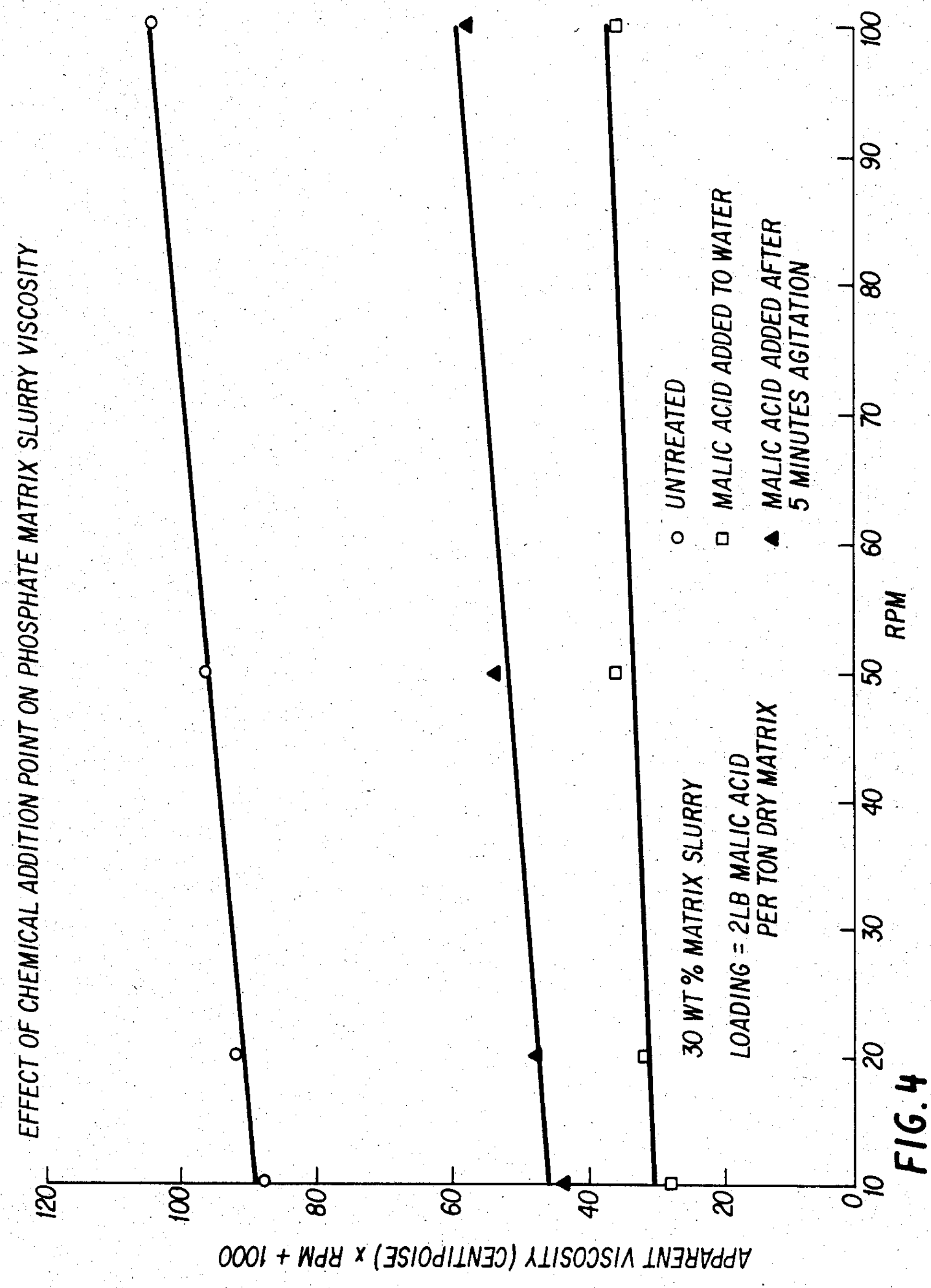

The procedures of Example 4 were followed, except that 2 pounds of malic acid per ton of dry matrix was used instead of succinic acid for Samples 2 and 3, a different matrix was used, and the slurry rheology was studied at 30% by weight solids rather than 40% by weight solids. The viscosity values of each of the samples are presented in Table 7 below and are illustrated by the graph of FIG. 4.

TABLE 7

| | Viscosity (Centipoise) at Indicated RPM | | | | |
|---|---|---|---|---|---|
| | 5 | 10 | 20 | 50 | 100 |
| Sample 1 | 18,400 | 8,800 | 4,600 | 1,920 | 1,040 |
| Sample 2 | 5,600 | 2,800 | 1,600 | 720 | 360 |
| Sample 3 | 8,000 | 4,400 | 2,400 | 1,080 | 580 |

EXAMPLE 8

(Viscosity Reduction With Maleic Acid)

The procedures of Example 4 were followed, except that 2 pounds of maleic acid per ton of dry matrix was used instead of succinic acid for Samples 2 and 3, a different matrix was used, and the slurry rheology was studied at 30% by weight solids rather than 40% by weight solids. The viscosity values of each of the samples are presented in Table 8 below.

TABLE 8

| | Viscosity (Centipoise) at Indicated RPM | | | | |
|---|---|---|---|---|---|
| | 5 | 10 | 20 | 50 | 100 |
| Sample 1 | 43,200 | 22,400 | 11,800 | 6,360 | 2,880 |
| Sample 2 | 12,800 | 6,400 | 3,400 | 1,520 | 820 |
| Sample 3 | 13,600 | 7,200 | 4,000 | 1,680 | 980 |

EXAMPLE 9

(Viscosity Reduction With Nitric Acid)

Figure 5:
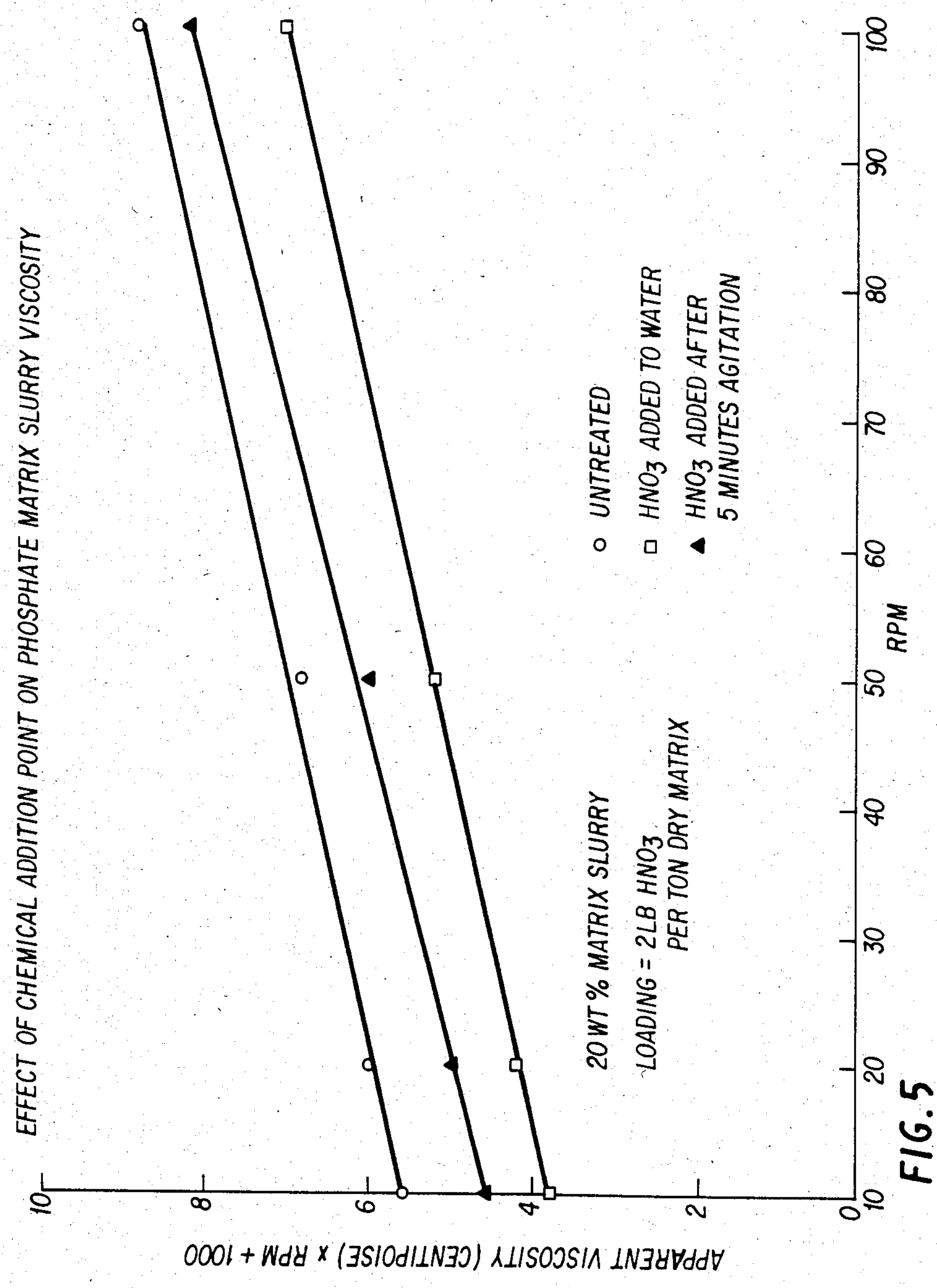

The procedures of Example 4 were followed, except that 2 pounds of nitric acid per ton of dry matrix was used instead of succinic acid for Samples 2 and 3, and the slurry rheology was studied at 20% by weight solids rather than 40% by weight solids. The viscosity values of each of the samples are presented in Table 9 below and are illustrated by the graph of FIG. 5.

TABLE 9

| | Viscosity (Centipoise) at Indicated RPM | | | | |
|---|---|---|---|---|---|
| | 5 | 10 | 20 | 50 | 100 |
| Sample 1 | 1,080 | 560 | 300 | 136 | 88 |
| Sample 2 | 720 | 380 | 210 | 104 | 70 |
| Sample 3 | 840 | 460 | 250 | 120 | 82 |

EXAMPLE 10

(Viscosity Reduction With Hydrochloric Acid)

Figure 6:
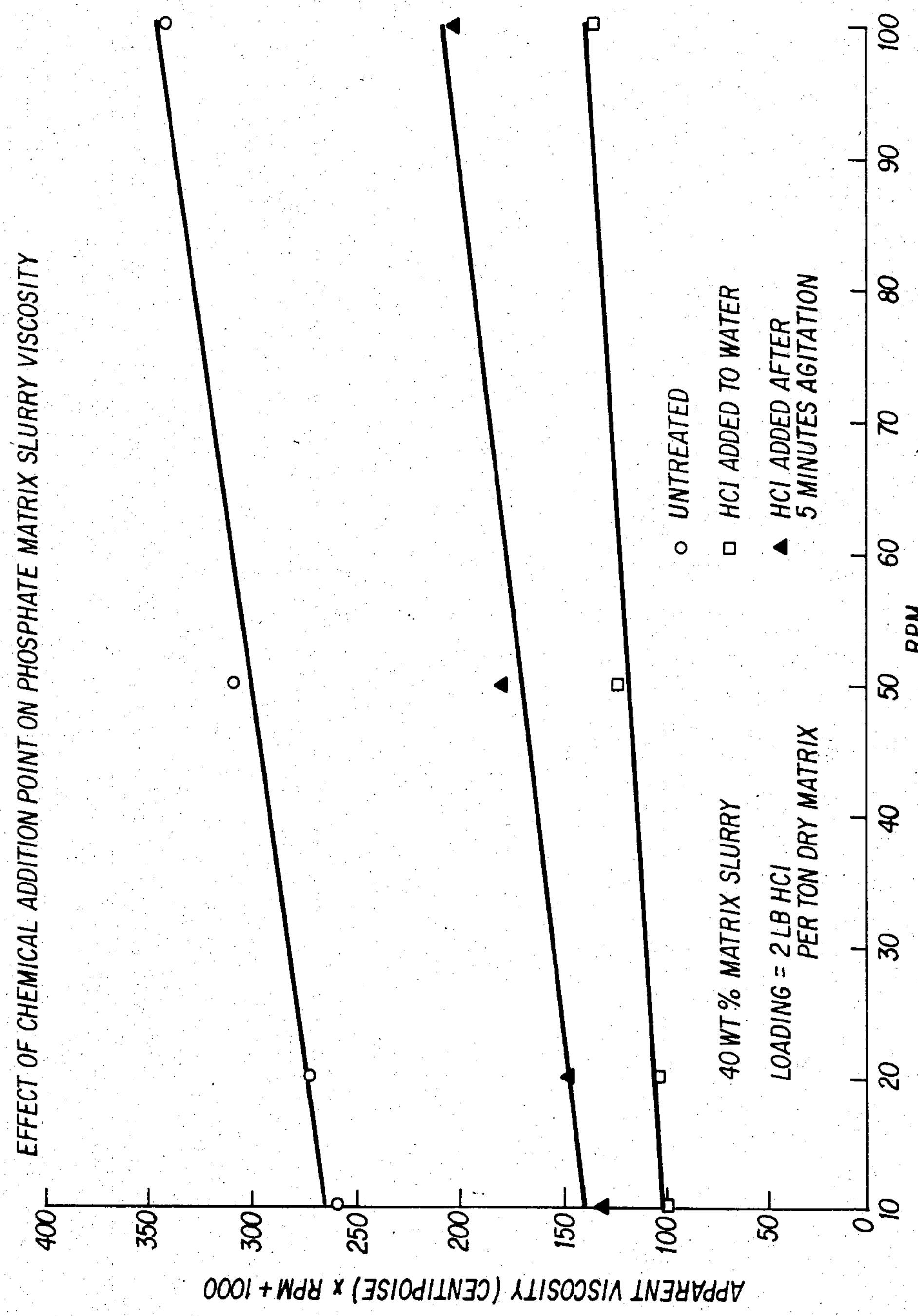

The procedures of Example 4 were followed, except that 2 pounds of hydrochloric acid per ton of dry matrix was used instead of succinic acid for Samples 2 and 3. The viscosity values of each of the samples are presented in Table 10 below and are illustrated by the graph of FIG. 6.

TABLE 10

| | Viscosity (Centipoise) at Indicated RPM | | | | |
|---|---|---|---|---|---|
| | 5 | 10 | 20 | 50 | 100 |
| Sample 1 | 30,400 | 26,000 | 13,600 | 6,160 | 3,400 |
| Sample 2 | 15,200 | 10,000 | 5,200 | 2,480 | 1,360 |
| Sample 3 | 15,200 | 13,200 | 7,400 | 3,600 | 2,020 |

EXAMPLE 11

(Viscosity Reduction With Stannic Chloride)

Figure 7:
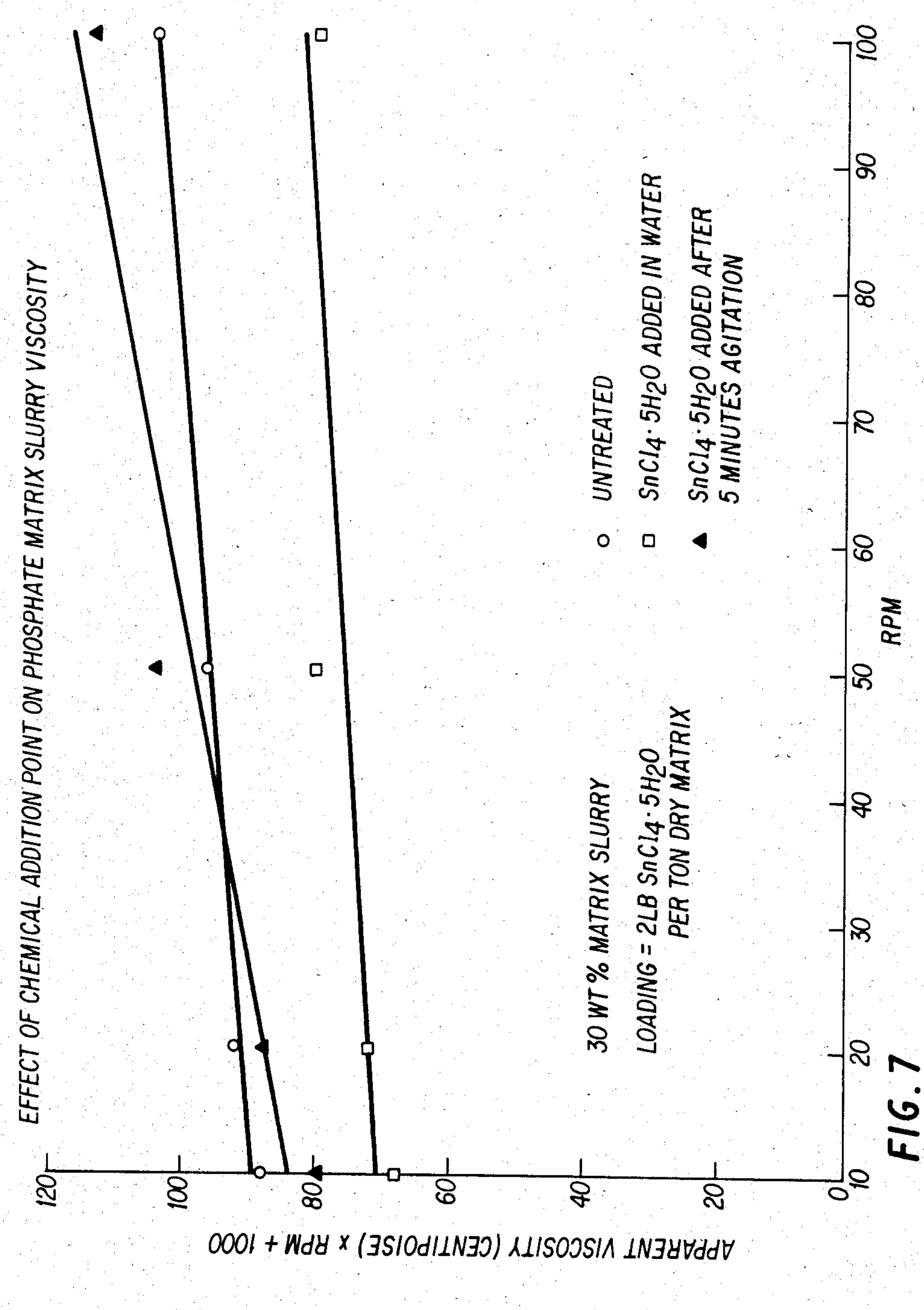

The procedures of Example 4 were followed, except that 2 pounds of stannic chloride ($SnCl_4.5H_2O$) per ton of dry matrix was used instead of succinic acid for Samples 2 and 3, a different matrix was used, and the slurry rheology was studied at 30% by weight solids rather than 40% by weight solids. The viscosity values of each of the samples are presented in Table 11 below and are illustrated by the graph of FIG. 7.

TABLE 11

| | Viscosity (Centipoise) at Indicated RPM | | | | |
|---|---|---|---|---|---|
| | 5 | 10 | 20 | 50 | 100 |
| Sample 1 | 18,400 | 8,800 | 4,600 | 1,920 | 1,040 |
| Sample 2 | 13,600 | 6,800 | 3,600 | 1,600 | 800 |
| Sample 3 | 15,200 | 8,000 | 4,400 | 2,080 | 1,140 |

EXAMPLE 12

(Viscosity Reduction With Ammonium Nitrate)

Figure 8:
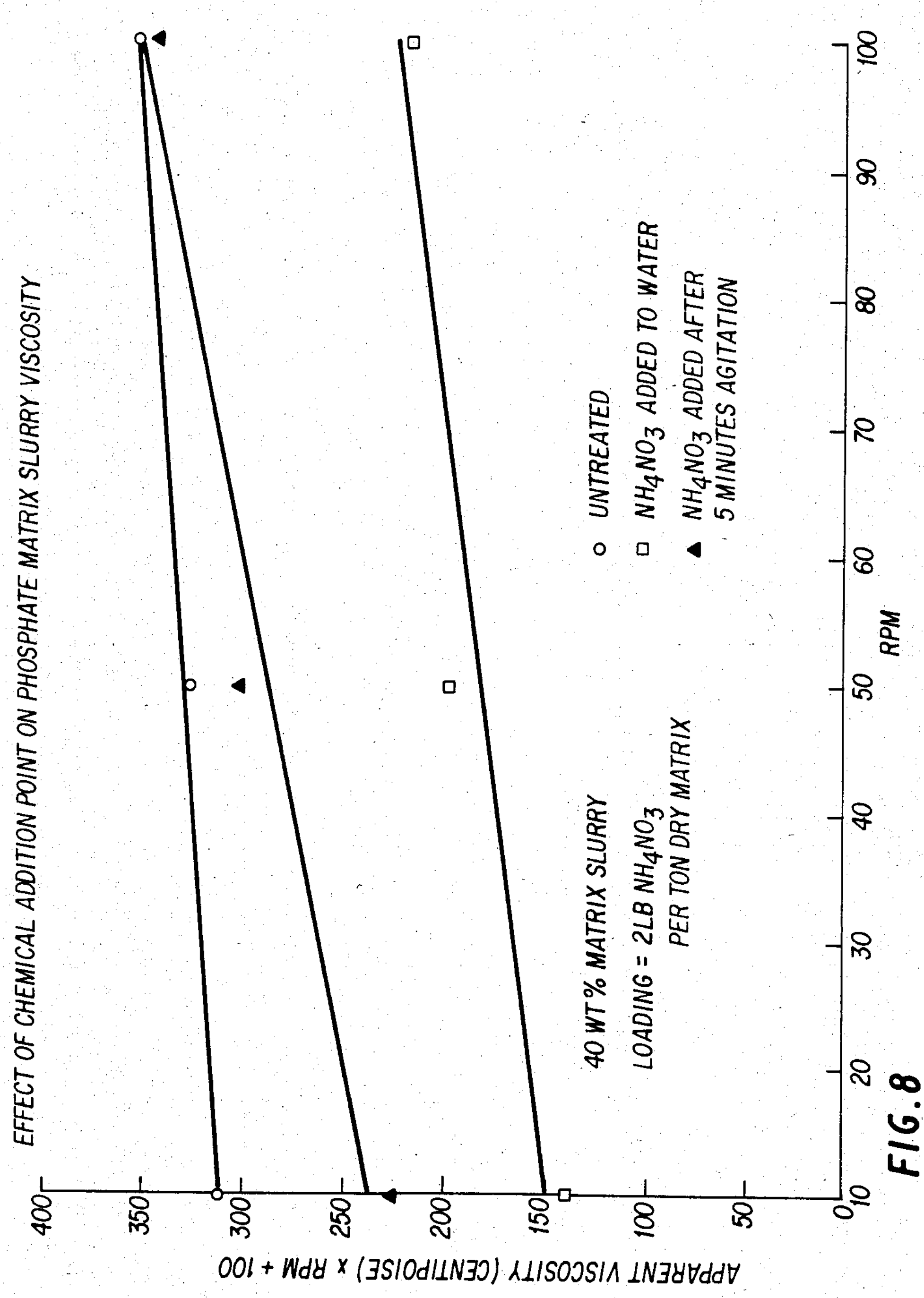

The procedures used in Example 4 were followed, except that 2 pounds of ammonium nitrate per ton of dry matrix was used instead of succinic acid for Samples 2 and 3, and a different section of matrix was used. The viscosity values of each of the samples are presented in Table 12 below and are illustrated by the graph of FIG. 8.

TABLE 12

| | Viscosity (Centipoise) at Indicated RPM | | | | |
|---|---|---|---|---|---|
| | 5 | 10 | 20 | 50 | 100 |
| Sample 1 | 29,600 | 31,200 | — | 6,480 | 3,480 |
| Sample 2 | 13,200 | 14,000 | — | 3,920 | 2,120 |
| Sample 3 | 10,400 | 22,800 | — | 6,000 | 3,380 |

EXAMPLE 13

(Viscosity Reduction With Ammonium Chloride)

Figure 9:
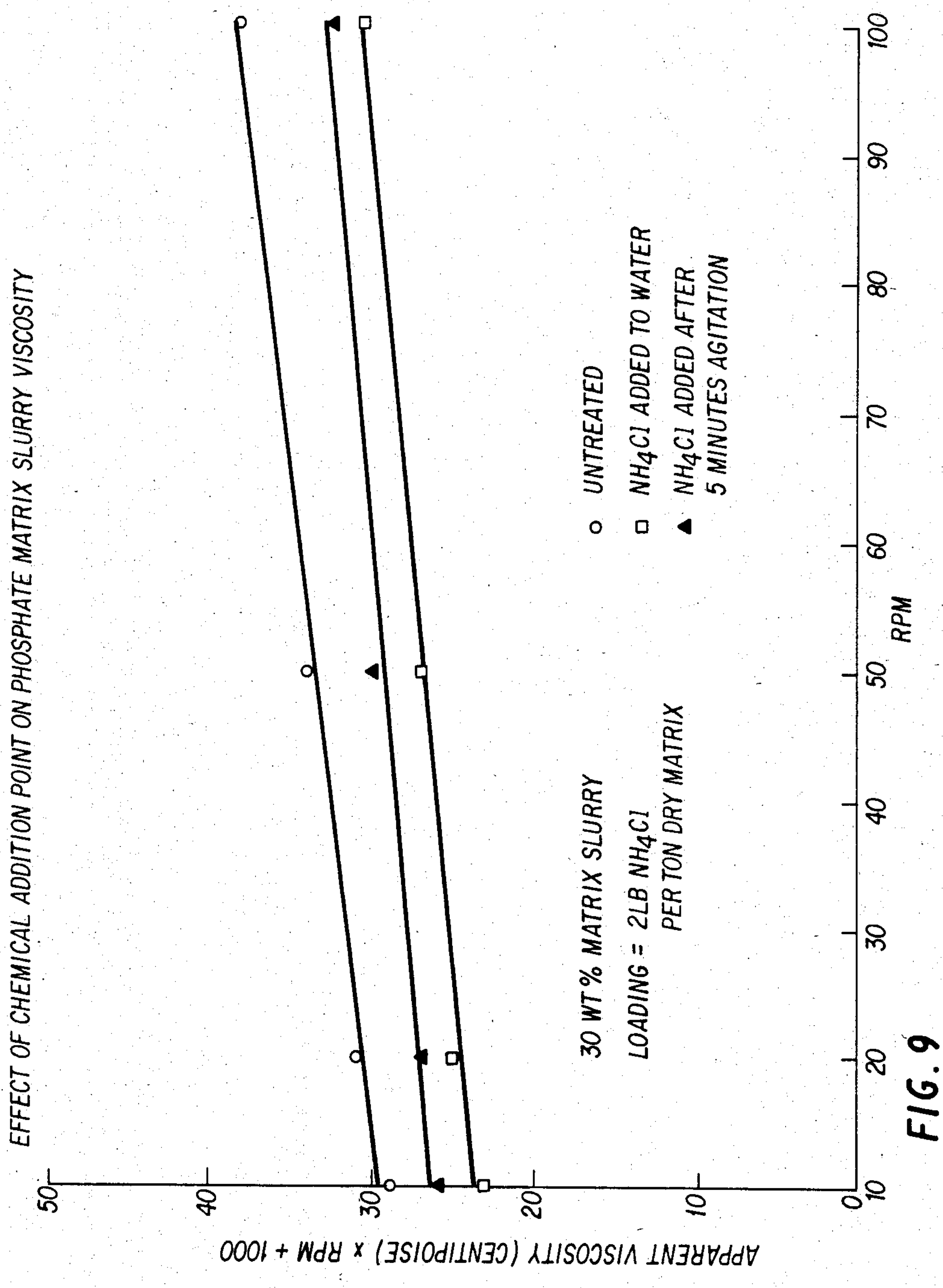

The procedures of Example 4 were followed, except that 2 pounds of ammonium chloride per ton of dry matrix was used instead of succinic acid for Samples 2 and 3, a different matrix was used, and the matrix solids content was reduced to 30% by weight prior to agitation and rheology measurements. The viscosity values of each of the samples are presented in Table 13 below and are illustrated by the graph of FIG. 9.

TABLE 13

| | Viscosity (Centipoise) at Indicated RPM | | | | |
|---|---|---|---|---|---|
| | 5 | 10 | 20 | 50 | 100 |
| Sample 1 | 5,400 | 2,900 | 1,550 | 680 | 380 |
| Sample 2 | 4,500 | 2,300 | 1,250 | 540 | 305 |
| Sample 3 | 5,100 | 2,600 | 1,350 | 600 | 325 |

Examples 14–17 indicate that some metal salts may also have viscosity-reducing properties when they are added to the water used to slurry the phosphate matrix.

EXAMPLE 14

(Viscosity Reduction With Ferric Chloride)

The procedures used in Example 4 were followed, except that 2 pounds of ferric chloride ($FeCl_3.6H_2O$) per ton of dry matrix was used instead of succinic acid for Samples 2 and 3. The viscosity values of each of the samples are presented in Table 14 below.

TABLE 14

| | Viscosity (Centipoise) at Indicated RPM | | | | |
|---|---|---|---|---|---|
| | 5 | 10 | 20 | 50 | 100 |
| Sample 1 | 30,400 | 26,000 | 13,600 | 6,160 | 3,400 |
| Sample 2 | 15,200 | 20,400 | 10,600 | 4,560 | 2,520 |

TABLE 14-continued

| | Viscosity (Centipoise) at Indicated RPM | | | | |
|---|---|---|---|---|---|
| | 5 | 10 | 20 | 50 | 100 |
| Sample 3 | 16,400 | 22,800 | 12,000 | 5,520 | 3,060 |

EXAMPLE 15

(Viscosity Reduction With Calcium Nitrate)

The procedures of Example 4 were followed, except that 2 pounds of calcium nitrate [$Ca(NO_3)_2.4H_2O$] per ton of dry matrix was used instead of succinic acid for Samples 2 and 3, and a different section of matrix was used. The viscosity values of each of the samples are presented in Table 15 below.

TABLE 15

| | Viscosity (Centipoise) at Indicated RPM | | | | |
|---|---|---|---|---|---|
| | 5 | 10 | 20 | 50 | 100 |
| Sample 1 | 29,600 | 31,200 | — | 6,480 | 3,480 |
| Sample 2 | 8,000 | 15,200 | — | 3,920 | 2,100 |
| Sample 3 | 16,000 | 28,800 | — | 7,760 | Off Scale |

EXAMPLE 16

(Viscosity Reduction With Aluminum Nitrate)

The procedures of Example 4 were followed, except that 2 pounds of aluminum nitrate per ton of dry matrix was used instead of succinic acid for Samples 2 and 3. The viscosity values for each of the samples are presented in Table 16 below.

TABLE 16

| | Viscosity (Centipoise) at Indicated RPM | | | | |
|---|---|---|---|---|---|
| | 5 | 10 | 20 | 50 | 100 |
| Sample 1 | 30,400 | 26,000 | 13,600 | 6,160 | 3,400 |
| Sample 2 | 21,600 | 16,400 | 8,800 | 4,080 | 2,380 |
| Sample 3 | 21,600 | 18,000 | 12,000 | 4,800 | 2,600 |

EXAMPLE 17

(Viscosity Reduction with Sodium Chloride)

The procedures of Example 4 were followed, except that 2 pounds of sodium chloride per ton of dry matrix was used instead of succinic acid for Samples 2 and 3. The viscosity values of each of the samples are presented in Table 17 below.

TABLE 17

| | Viscosity (Centipoise) at Indicated RPM | | | | |
|---|---|---|---|---|---|
| | 5 | 10 | 20 | 50 | 100 |
| Sample 1 | 30,400 | 26,000 | 13,600 | 6,160 | 3,400 |
| Sample 2 | 13,600 | 20,000 | 10,800 | 4,800 | 2,640 |
| Sample 3 | 17,600 | 22,000 | 10,800 | 5,920 | 2,880 |

Examples 4–17 clearly demonstrate the significantly greater degree of viscosity reduction obtained by pretreating the water utilized to slurry the phosphate matrix with an additive, as compared to the treatment of a previously-formed slurry with the same additive. Without wishing to be bound by any theory of operability, it is believed that the additives of the present invention may act as anti-dispersants to prevent the clay contained in the phosphate matrix from breaking up into finer particles. This anti-dispersant action in effect reduces the viscosity of the phosphate matrix slurry. If the viscosity-reducing additives are added to a phosphate matrix slurry rather than to the water utilized to form the slurry, the viscosity reducing effect of the additives is significantly diminished because the clay contained in the matrix has already been broken up into finer particles during formation of the slurry.

The following examples illustrate the effect of the additives of the invention on the consolidation characteristics of the phosphatic clays.

EXAMPLE 18

(Clay Consolidation Acceleration With Ammonium Nitrate)

The clay consolidation-enhancing properties of ammonium nitrate were tested on a typical phosphate matrix obtained from a mining site in the Fort Meade, Fla., area containing 87.5 weight % solids. The matrix was slurried at 40 weight % solids with water previously treated with 3 pounds of ammonium nitrate per ton of matrix. The resulting slurry was subjected to high shear conditions (20 minutes agitation with a twin-blade mixer) to simulate field operations.

Phosphatic clay waste was generated by screening the slurry through a 150 mesh screen, collecting the underflow and diluting it to 3.5 weight % solids. The water used for both screening and dilution was untreated water.

The resulting clay slurry was then consolidated in a laboratory consolidometer which simulates clay consolidation of commercial size ponds under laboratory conditions under an effective stress of $0.21\pm0.02$ psi.

Figure 10:
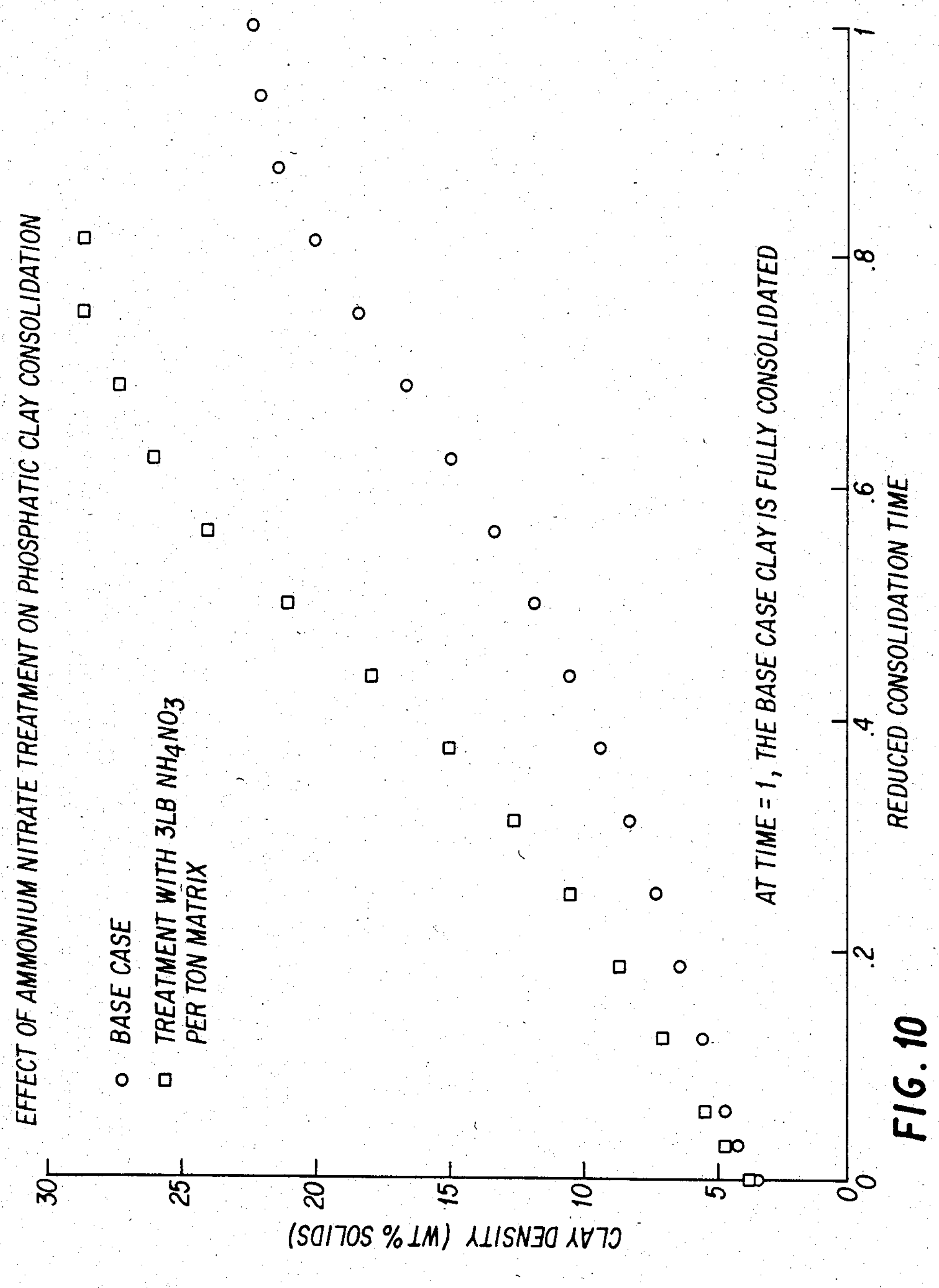

A comparison of the consolidation characteristics of this clay slurry was made with those of a base case slurry generated from the same matrix, after it had been slurried to 40 weight % solids using untreated water. The respective consolidation curves are shown in FIG. 10. The data of FIG. 10 indicates that the treatment of the water with ammonium nitrate increased the consolidation rate by 50% and the final consolidation density by 6.2 weight % solids.

The following examples indicate that some metal salts, also when added to the water prior to the slurry formation, may enhance consolidation properties of the phosphatic clays.

EXAMPLE 19

(Clay Consolidation Acceleration With

Ferric Chloride and Tin Tetrachloride)

The clay consolidation-enhancing properties of ferric oxide were tested on a typical phosphate matrix from the Fort Meade, Fla., area containing 69 weight % solids.

The matrix was slurried at 40 weight % solids with water previously treated with 2.9 pounds of ferric chloride, $FeCl_3.6H_2O$, per ton of matrix. The resulting slurry was subjected to high shear conditions (20 minutes agitation with a twin-blade mixer) to simulate field operations.

Phosphatic clay waste was generated by screening the slurry through a 150 mesh screen, collecting the underflow and diluting it to 3.5 weight % solids. The water used for both screening and dilution was untreated water.

The resulting clay slurry was then consolidated in a laboratory consolidometer under an effective stress of $0.21\pm0.02$ psi.

The above procedure was then repeated, with the exception that the water was treated with 3.5 pounds of tin tetrachloride, $SnCl_4.5H_2O$, per ton of matrix instead of ferric chloride.

The consolidation characteristics of these two clay slurries were compared with those of a base case clay slurry, resulting from a repeat of the above procedure with no water treatment. The respective consolidation curves are shown in FIG. 11.

Figure 11:
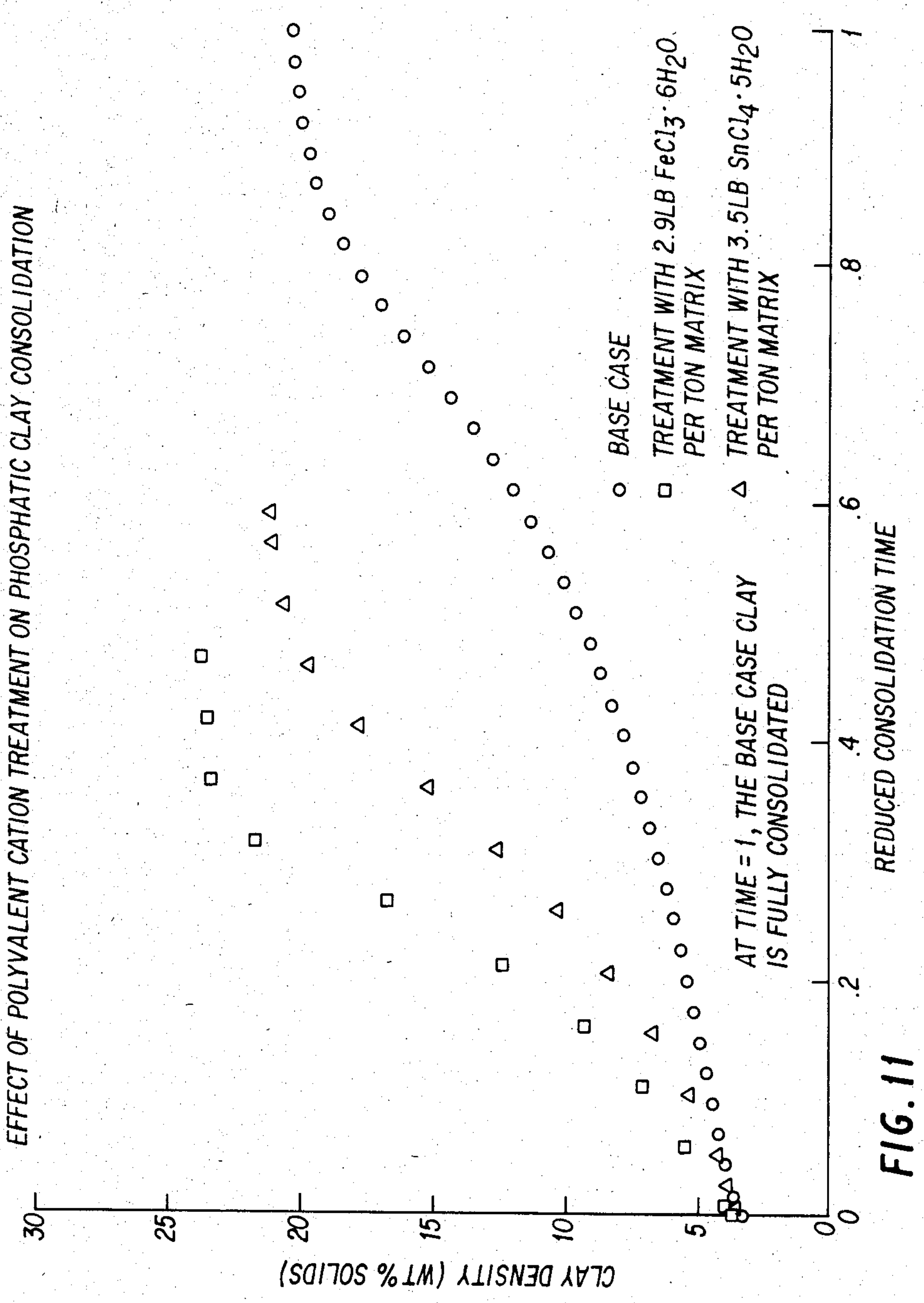

The data of FIG. 11 indicates that the $FeCl_3.6H_2O$ treatment increased the clay consolidation rate by 450% and increased the final clay density by 3.5 weight %. The FIG. 11 data also indicates that the $SnCl_4.5H_2O$ treatment increased the clay consolidation rate by 120% and increased the final clay density by 1.0 weight %.

Other metal salts which are effective in accelerating consolidation characteristics of phosphatic clays are NaCl, KCl, $Al_2(SO_4)_3$, $Al(NO_3)_3$, in a hydrated or dry form, $CaSO_4$ and $Ca(NO_3)_2$, in a hydrated or dry form.

EXAMPLE 20

(Clay Consolidation Acceleration with Magnesium Nitrate)

The clay consolidation-enhancing properties of magnesium nitrate were tested on a typical phosphate matrix obtained from a mining site in the Fort Meade, Fla. area, containing 69 weight % solids. Phosphatic clay samples from this matrix were prepared according to the following procedures:

Sample 1 (Base Case)

The matrix was slurried to 40 weight % solids with untreated water. The resulting slurry was subjected to high shear conditions (20 minutes agitation with a twin-blade mixer) to disperse the solids and simulate pumping of the matrix slurry from a mine to a beneficiation plant.

Phosphatic clay waste was generated by screening the slurry through a 150 mesh screen, collecting the underflow and diluting it to 3.5 weight % solids. The water used for both screening and dilution was untreated water.

Sample 2

The same procedure was repeated as described above for Sample 1, except that 2.5 pounds of magnesium nitrate per ton of dry matrix was dissolved in the water, utilized to form the phosphate matrix slurry, prior to the contact of the water with the matrix.

Sample 3

The same procedure was followed as in Sample 1, except that 2.7 pounds of magnesium nitrate per ton of dry phosphate matrix was added directly to the final phosphatic clay slurry. The slurry was gently mixed to insure intimate contact of the chemical and the clay.

Figure 12:
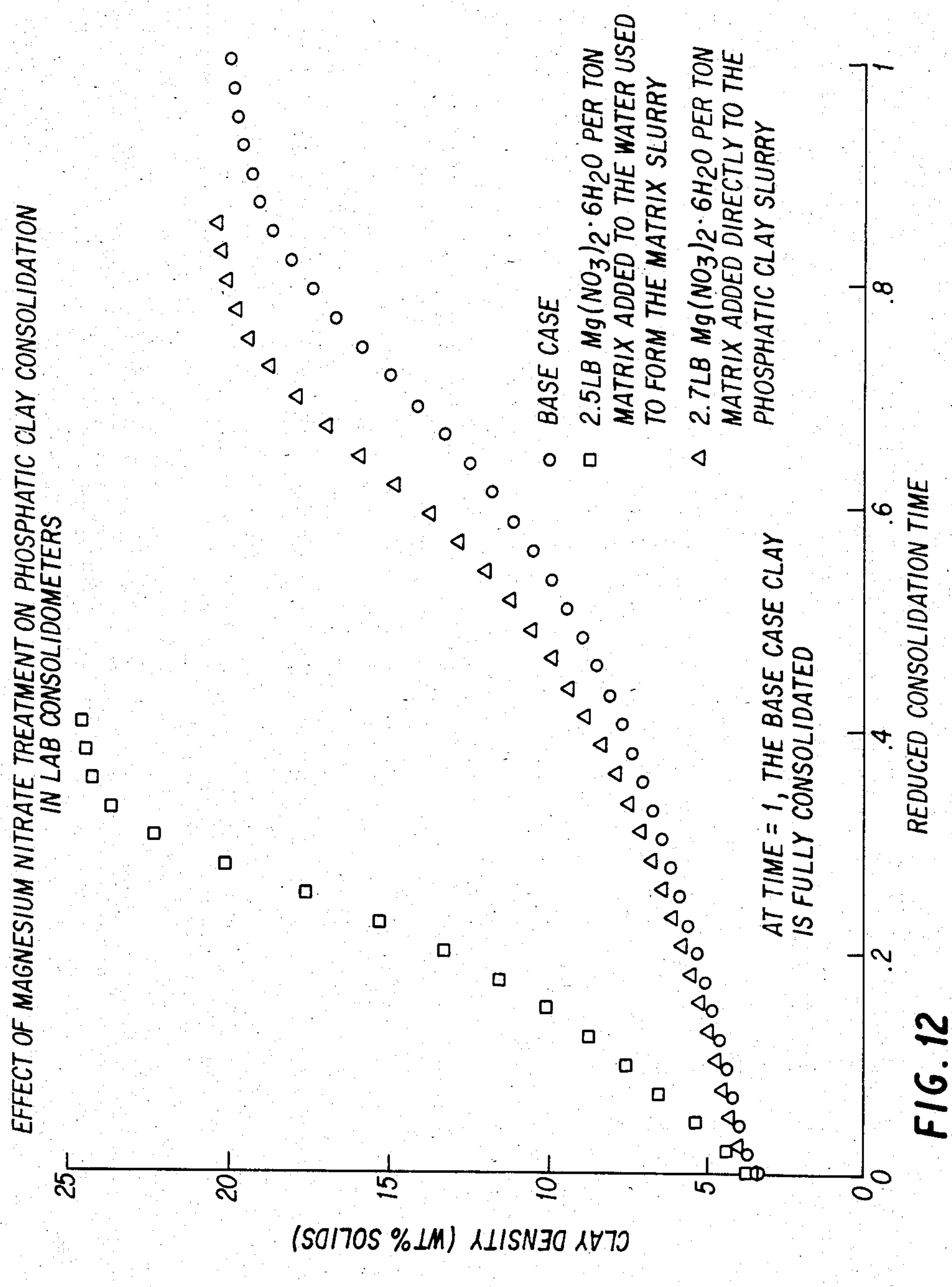

Each of the three phosphatic clay samples was then consolidated in a laboratory consolidometer under an effective stress of 0.21±0.02 psi. Their respective consolidation curves are shown in FIG. 12. The data of FIG. 12 indicates that the magnesium nitrate is much more effective in improving clay consolidation properties when added to the water used to form the matrix slurry, than when it is added directly to the phosphatic clay slurry.

EXAMPLE 21

(Clay Consolidation Acceleration with Hydrochloric Acid)

The clay consolidation-enhancing properties of hydrochloric acid were tested on a typical phosphate matrix obtained from a mining site in the Fort Meade, Fla. area, containing 82.2% weight solids.

The matrix was slurried to 40 weight % solids with water treated with 1.0 pound HCl per ton of matrix. The resulting slurry was subjected to high shear conditions (20 minutes agitation with a twin-blade mixer) to simulate field operations.

Phosphatic clay waste was generated by screening the slurry through a 150 mesh screen, collecting the underflow and diluting it to 3.5 weight % solids. The water used for both screening and dilution was untreated water.

The resulting clay slurry was then consolidated in a laboratory consolidometer under an effective stress of 0.21±0.02 psi.

A comparison of the consolidation characteristics of this clay slurry was made with those of a base case slurry generated from the same matrix, after it had been slurried to 40 weight % solids using untreated water. The respective consolidation curves are shown in FIG. 13.

Figure 13:
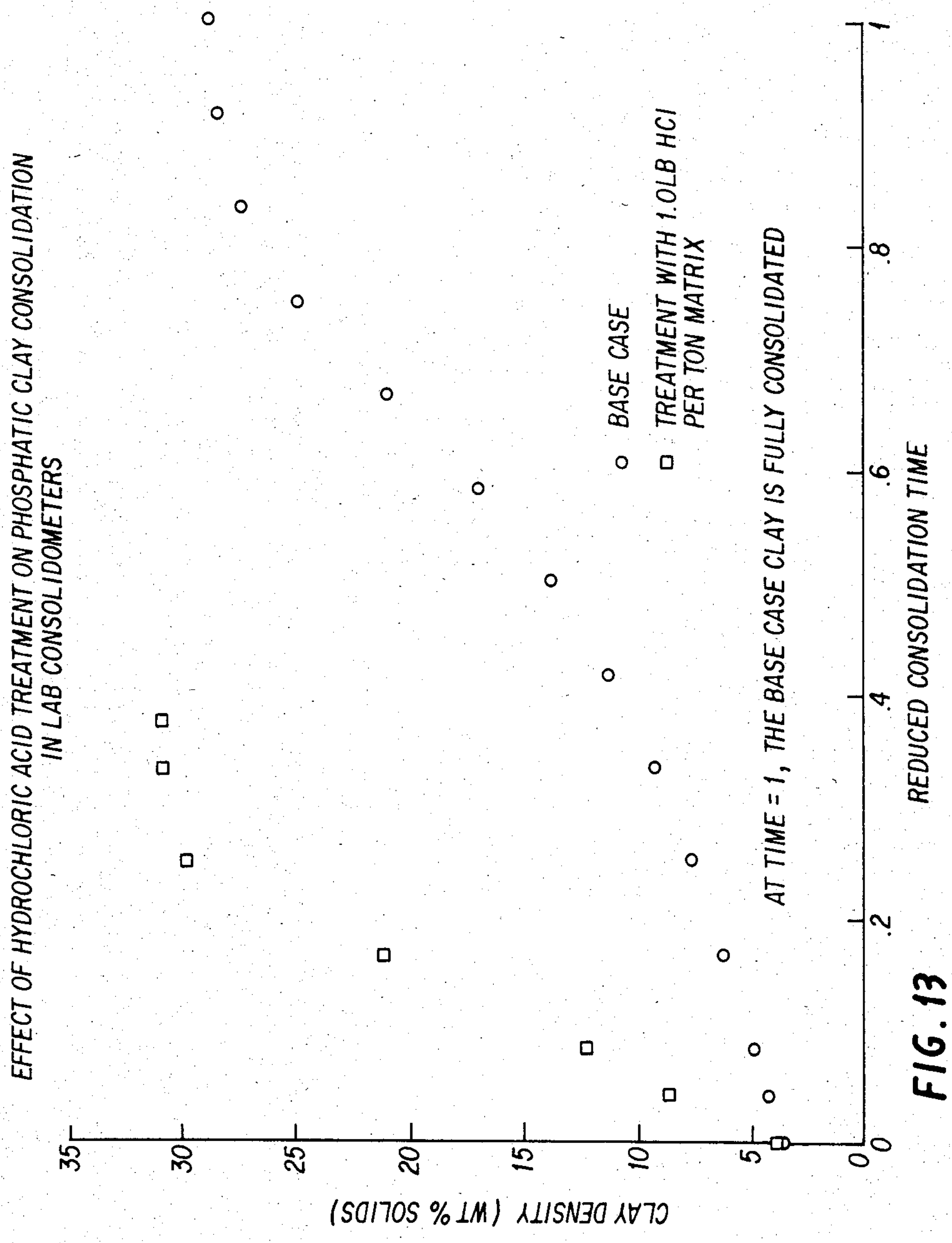

The data of FIG. 13 indicates that the HCl treatment increased the clay consolidation rate by 460% and increased the final clay density by 2.1 weight %.

EXAMPLES 22-25

(Clay Consolidation Acceleration With Aluminum Sulfate, Aluminum Nitrate, Calcium Nitrate And Calcium Sulfate)

In Example 22, the clay consolidation-enhancing properties of aluminum sulfate [$Al_2(SO_4)_3$] were tested on a typical phosphate matrix from the Fort Meade, Fla. area, containing 69 weight % solids.

The matrix was slurried to 40 weight % solids with water treated with 2.64 pound $Al_2(SO_4)_3$ per ton of matrix. The resulting slurry was subjected to high shear conditions (20 minutes agitation with a twin-blade mixer) to simulate field operations.

Phosphatic clay waste was generated by screening the slurry through a 150 mesh screen, collecting the underflow and diluting it to 3.5 weight % solids. The water used for both screening and dilution was untreated water.

The resulting clay slurry was then consolidated in a laboratory consolidometer under an effective stress of 0.21±0.02 psi.

Figure 14:
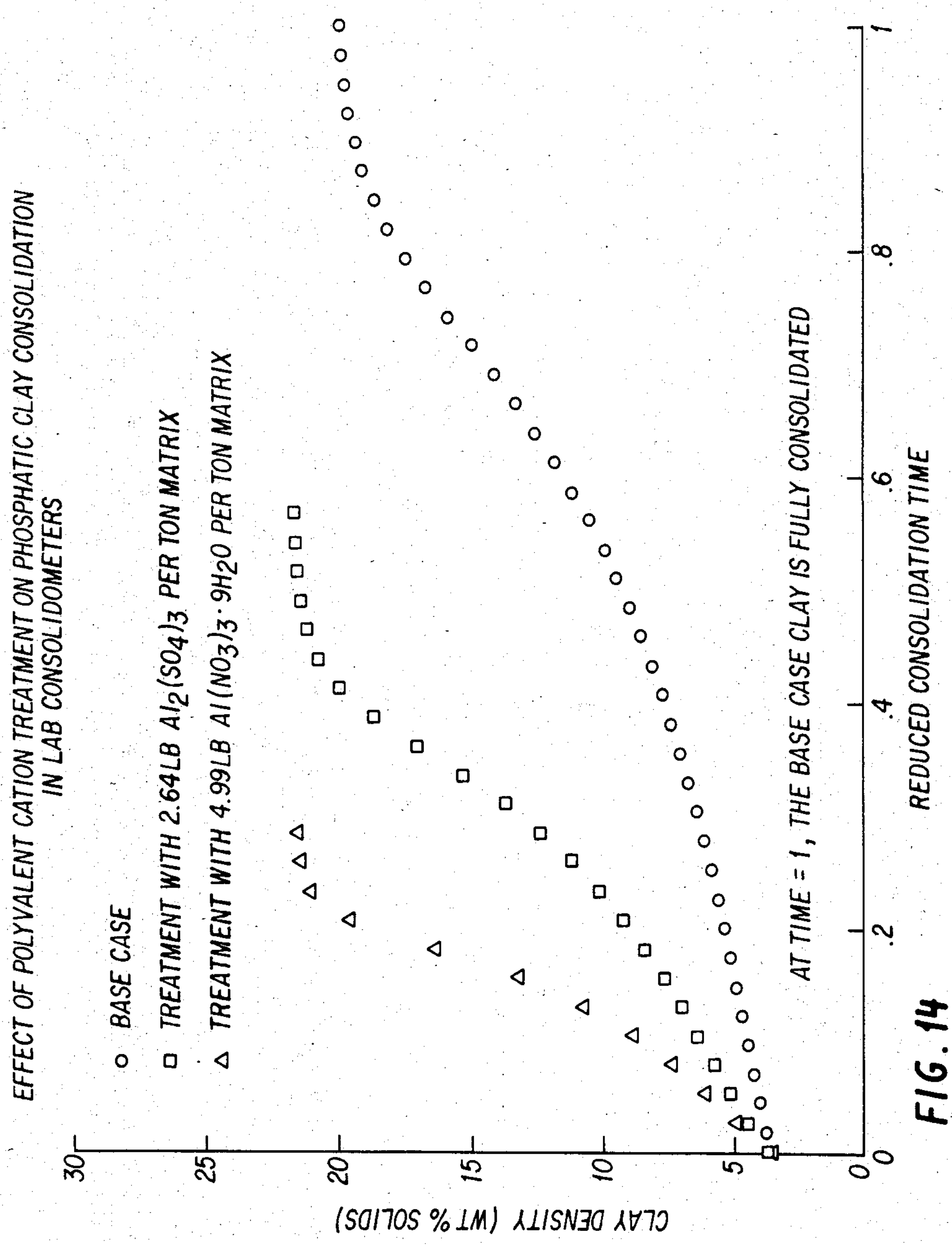
Figure 15:
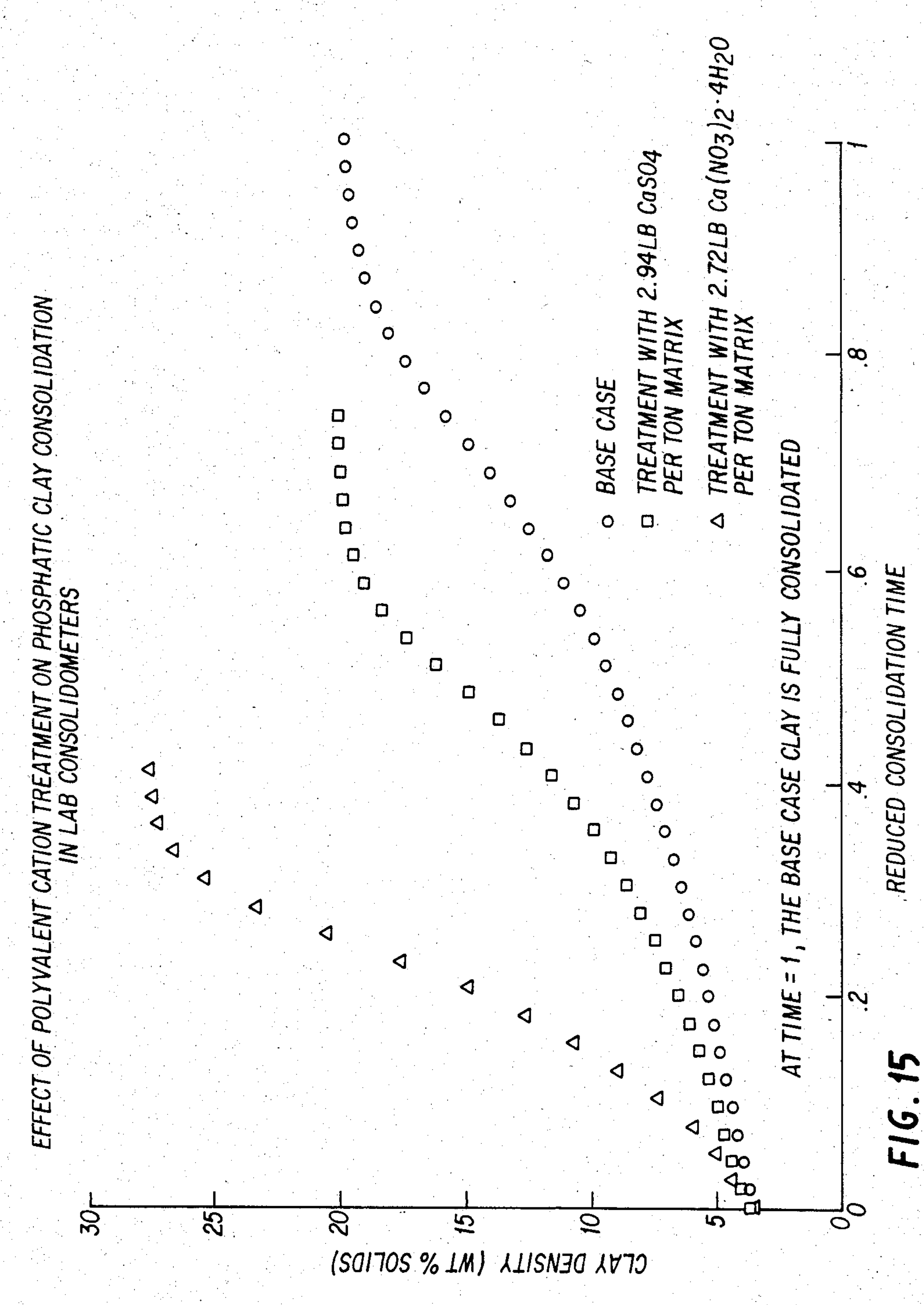

Three different water treatments were then investigated, using the above-procedure, but replacing aluminum sulfate with:

Example 23: 4.99 lb $Al(NO)_3)_3.9H_2O$/ton matrix
Example 24: 2.94 lb $CaSO_4$/ton matrix
Example 25: 2.72 lb $Ca(NO_3)_2.4H_2O$/ton matrix The consolidation characteristics of these four clay slurries were compared with those of a base case slurry, resulting from a repeat of the above procedure using untreated water to prepare the phosphate matrix slurry. The results are summarized in Table 18 and in FIGS. 14 and 15.

TABLE 18

Effect of Using Nitrates and Sulfates in Polyvalent Cation Treatment of the Matrix Slurry Water on Clay Consolidation in Laboratory Consolidometers

| Additive | Final Consolidated Clay Density (wt % solids) | Relative Consolidation Rate |
|---|---|---|
| None - Base case | 20.0 | 1.00 |
| 2.64 lb $Al_2(SO_4)_3$/ton matrix | 21.7 | 2.75 |
| 4.99 lb $Al(NO_3)_3.9H_2O$/ton matrix | 21.7 | 5.50 |
| 2.94 lb $CaSO_4$/ton matrix | 20.2 | 1.57 |

TABLE 18-continued

Effect of Using Nitrates and Sulfates in Polyvalent Cation Treatment of the Matrix Slurry Water on Clay Consolidation in Laboratory Consolidometers

| Additive | Final Consolidated Clay Density (wt % solids) | Relative Consolidation Rate |
|---|---|---|
| 2.72 lb $Ca(NO_3)_2.4H_2O$/ton matrix | 26.8 | 3.66 |

The data indicates that the metal nitrates are more effective in enhancing the slurry consolidation characteristics than the metal sulfates. The aluminum nitrate treatment increased the clay consolidation rate by 100% over that from the aluminum sulfate treatment. The calcium nitrate treatment not only increased the clay consolidation rate by 130%, but also increased the final clay density by 6.6 weight % over that from the calcium sulfate treatment.

EXAMPLES 26–27

(Clay Consolidation Acceleration With Sodium Chloride and Potassium Chloride)

In Example 26, the clay consolidation-enhancing properties of sodium chloride (NaCl) were tested on a typical phosphate matrix from the Fort Meade, Fla. area, containing 69 weight % solids.

The matrix was slurried to 40 weight % solids with water treated with 2.33 pound NaCl per ton of matrix. The resulting slurry was subjected to high shear conditions (20 minutes agitation with a twin-blade mixer) to simulate field operations.

Phosphatic clay waste was generated by screening the slurry through a 150 mesh screen, collecting the underflow and diluting it to 3.5 weight % solids. The water used for both screening and dilution was untreated water.

The resulting clay slurry was then consolidated in a laboratory consolidometer under an effective stress of $0.21 \pm 0.02$ psi.

In Example 27, the above procedure was then repeated, except that the water was treated with 2.97 pound of potassium chloride (KCl) per ton of matrix instead of NaCl.

The consolidation characteristics of these two clay slurries were compared with those of a base case clay slurry, resulting from a repeat of the above procedure using untreated water to prepare the phosphate matrix slurry. The respective consolidation curves are shown in FIG. 16.

Figure 16:
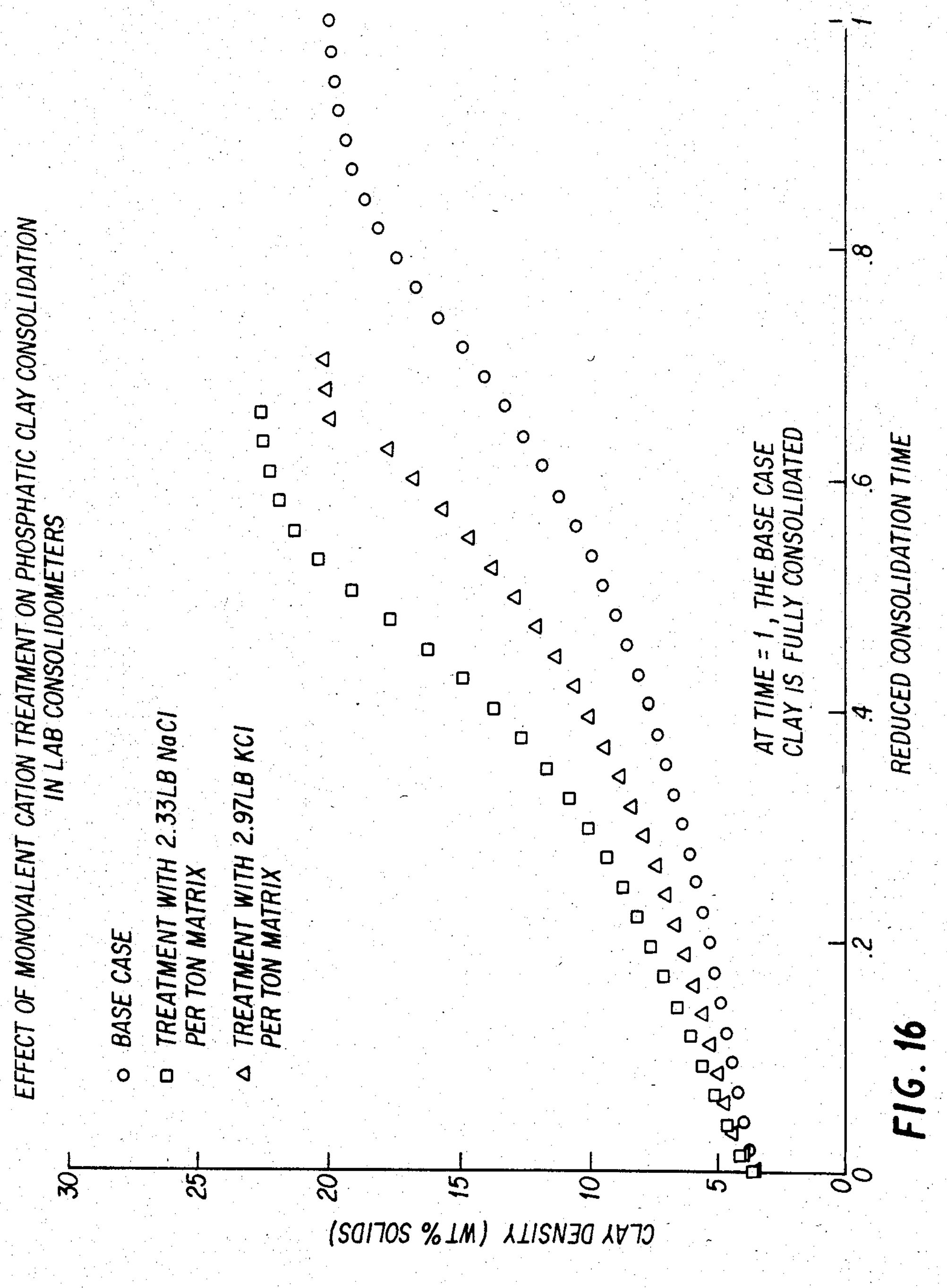

The data of FIG. 16 indicates that the NaCl treatment increased the clay consolidation rate by 180% and increased the final clay density by 2.6 weight %. The KCl treatment increased the clay consolidation rate by 80% and increased the final clay density by 0.3 weight %.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

What is claimed is:

1. A method of producing a water-based phosphate matrix slurry, comprising:

dissolving an additive in the water utilized to form the slurry prior to the formation of the slurry, wherein said additive is a water-soluble compound selected from the group consisting of organic acids, monovalent non-metallic inorganic salts, polyvalent non-metallic inorganic salts and stannic chloride, said additive having a water solubility of at least 0.02% by weight; and combining the additive-containing water with a phosphate matrix to obtain a slurry of the phosphate matrix in the additive-containing water.

2. The method of claim 1 wherein the additive is an organic acid selected from the group consisting of carboxylic, dicarboxylic and hydroxy acids containing from 1 to 5 carbon atoms.

3. The method of claim 2 wherein said acid contains from 1 to 4 carbon atoms.

4. The method of claim 3 wherein said acid is selected from the group consisting of succinic acid, formic acid, maleic acid and malic acid.

5. The method of claim 1 wherein the additive is a monovalent non-metallic inorganic salt selected from the group consisting of ammonium nitrate and ammonium chloride.

6. The method of claim 5 wherein the additive is ammonium nitrate.

7. The method of claim 1 wherein the additive is stannic chloride.

8. The method of claim 1 wherein ½ to 10 pounds of the additive per ton of dry phosphate matrix is dissolved in water.

9. A method of reducing the viscosity of water-based phosphate matrix slurries, consisting essentially of:

dissolving a viscosity-reduction effective amount of an additive in the water utilized to form the slurry, prior to the formation of the slurry, wherein said additive is a water-soluble compound selected from the group consisting of organic acids, mineral acids, monovalent metallic or non-metallic inorganic salts, polyvalent metallic or non-metallic inorganic salts and mixtures thereof, said additive having a water solubility of at least 0.02 weight %; and combining the additive-containing water with the as-mined phosphate matrix to obtain a slurry of the phosphate matrix in the additive-containing water.

10. A method of claim 9 wherein the resulting slurry contains about 2 to about 30,000 ppmw of the additive.

11. A method of claim 10 wherein the additive is an organic acid selected from the group consisting of carboxylic, dicarboxylic and hydroxy acids containing from 1 to 5 carbon atoms.

12. A method of claim 11 wherein said acid contains from 1 to 4 carbon atoms.

13. A method of claim 12 wherein said acid is selected from the group consisting of succinic acid, formic acid, maleic acid and malic acid.

14. A method of claim 10 wherein the additive is a monovalent non-metallic inorganic salt selected from the group consisting of ammonium nitrate and ammonium chloride.

15. The method of claim 14 wherein the additive is ammonium nitrate.

16. A method of claim 10 wherein the additive is a mineral acid selected from the group consisting of nitric acid, hydrochloric acid, hydrobromic acid, hydrofluoric acid, phosphoric acid, sulfuric acid and perchloric acid.

17. A method of claim 16 wherein the mineral acid is nitric acid or hydrochloric acid.

18. A method of claim 10 wherein the additive is a monovalent metallic salt selected from the group consisting of sodium chloride and potassium chloride.

19. A method of claim 10 wherein the additive is a polyvalent inorganic salt selected from the group consisting of stannic chloride, aluminum

* * * * *